Patented Feb. 12, 1924.

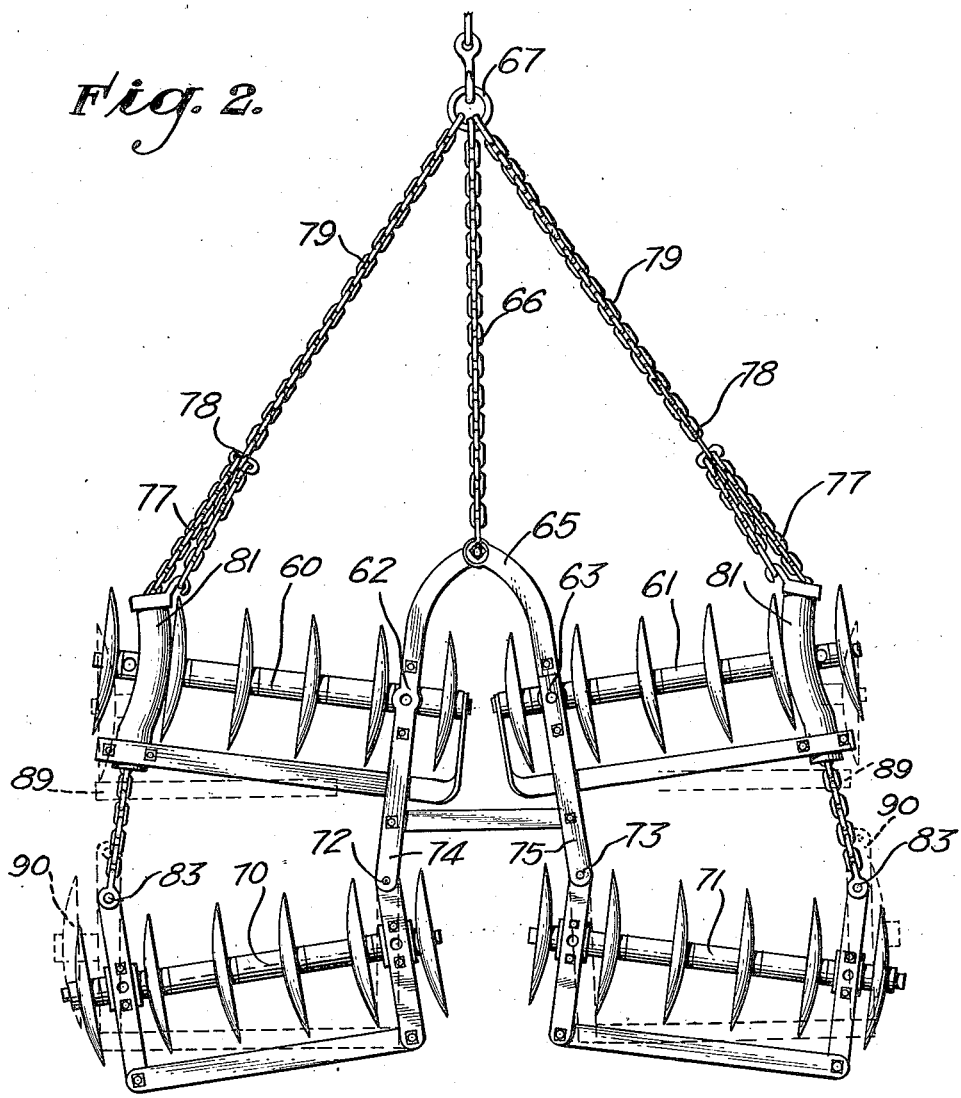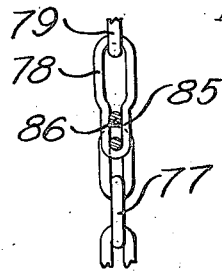

1,483,381

UNITED STATES PATENT OFFICE.

JOSEPH S. REYNOLDS, OF SANTA BARBARA, CALIFORNIA.

SINGLE AND DOUBLE TANDEM DISK HARROW.

Application filed September 21, 1922. Serial No. 589,545.

*To all whom it may concern:*

Be it known that I, JOSEPH S. REYNOLDS, a citizen of the United States, residing at Santa Barbara, in the county of Santa Barbara and State of California, have invented a new and useful Improvement in Single and Double Tandem Disk Harrows, of which the following is a specification.

My invention relates to agricultural implements and is more particularly related to the construction of disk harrows. For the purpose of preparing soil for agricultural purposes, harrows are employed which are provided with steel disks mounted in sets or gangs. These disks roll over the surface of the ground and perform a mincing operation thereupon which is highly desirable as a preparation previous to planting. It is desirable to place these disks at a slight inclination with relation to the direction in which they will travel in order that a shearing or turning action may be accomplished, and it is customary to employ in such harrows several gangs of disks which are diverged one from the other in order that the side pull of one gang may be offset by the side pull of the other gang.

It is an object of my invention to provide a simple and economical form of construction which may be employed with tandem harrows, both of the single and double types. In agricultural implements a tandem harrow is one in which one gang of disks is drawn behind another gang of disks in tandem formation, and by double tandem is meant the employment of two single tandems placed side by side.

It is a further object of the invention to provide an expedient and effective means for adjusting the angular relationship between the leading and following gangs of a harrow.

It is a further object of the invention to provide such an adjustment device by which the forward adjustment of one disk gang is accompanied by a rearward adjustment of the other disk gang, thus accomplishing a balance between the forward and rearward members.

The especial advantages of the invention and further objects thereof will be made evident hereinafter.

Referring to the drawings which are for illustrative purposes only,

Fig. 2 is a plan view of a double tandem disk harrow in which the features of my invention are embodied.

Fig. 3 is an enlarged detail of the grab link employed in the improved adjustment device I have developed.

Figure 1:
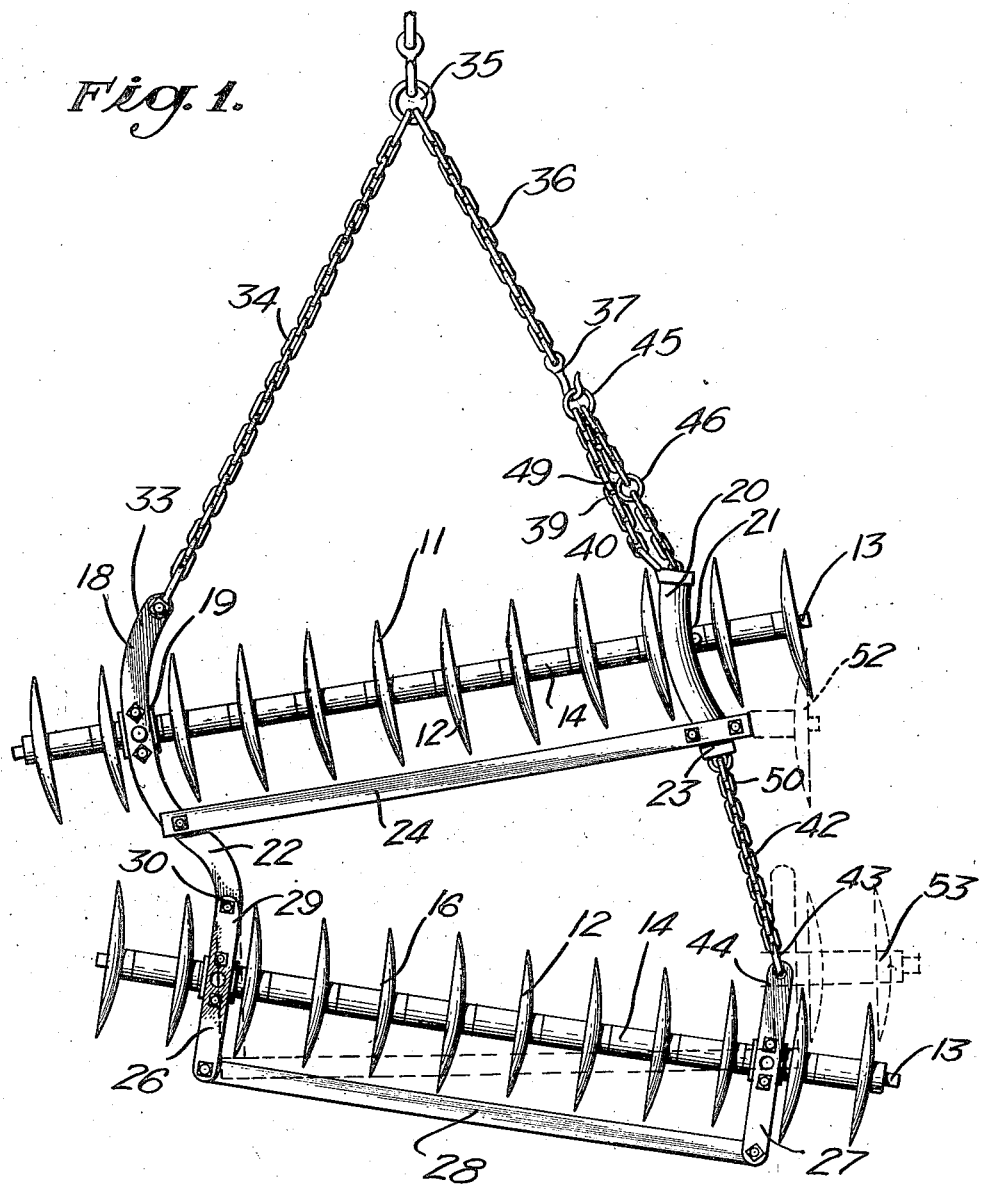
Fig. 1 is a plan view of a single tandem harrow embodying the features of my invention.

With reference to Fig. 1, I show a forward gang 11 comprised of a plurality of disks 12 which are mounted upon a shaft 13 and are disposed between spacers 14. Rearwardly of the leading gang 11 is placed a following gang 16 which is composed also of disks 12 mounted upon a shaft 13 and separated by spacers 14, the only difference between the leading and following gang being that the dish of the disks are faced in opposite directions.

Near the left hand end of the gang 11 a pull bar 18 is mounted upon a block 19, this bar 18 being of curved linear form, as indicated. Near the right hand end of the gang 11 a short length of pipe 20 is similarly mounted upon a block 21 and the rearwardly extending portions 22 and 23 of the members 18 and 20 are connected together by a cross bar 24, thus forming what may be termed a vehicle. The gang 16 has mounted near each end thereof following bars 26 and 27 which are connected together at their rear ends by a cross bar 28, thus forming a following vehicle. The forward end 29 of the following bar 26 is pivoted at 30 to the rearward extension 22 of the pull bar 18. From the forward end 33 of the pull bar 18 a chain 34 extends to a drag link 35 which has also attached thereto a short chain 36 provided with a hook 37. A chain 39 is attached to the forward end of the pipe 20 at 40 and the other end 42 of the chain 39 is passed back through the pipe 20 and attached at 43 to the forward end 44 of the follow bar 27. Several large links 45 and 46 are placed intermediately in the chain 39 to provide for the engagement of the hook 37 with the chain 39.

It will be seen that with the hook 37 in the link 45, the chain 39 will be divided into two portions, one portion 49 extending back to the point of connection 40 with the pipe 20 which is mounted upon the forward gang 11, and the other portion 50 of the chain extending back to the bar 27. With the hook 37 engaged in the ring 45, the sides 49 and 50 of the chain are so proportioned that as the harrow is drawn forward a direct pull upon the forward member from the drag link 35 is accomplished through the chain 36 and the portion 49 of the chain 39, and that a direct pull upon the rear member of the tandem is accomplished through the chain 36 and the portion 50 of the chain 39, the forward and rearward members of the tandem assuming the angular position shown.

By changing the hook 37 to the ring 46, that portion of the chain 39 between the rings 45 and 46 becomes transferred to the portion 49 and is subtracted from the portion 50. The adjustable ends of the gangs 11 and 16 then assume changed relative positions, the forward gang 11 dropping back as indicated by the dotted lines 52 and the rearward gang being pulled into the forward position indicated by the dotted lines 53. The rings 45 and 46 may be disposed in the chain 39 as desired to give greater or lesser degrees of adjustment and a greater number of these engagement links may be provided, this of course being merely a matter of design to meet working conditions.

In Fig. 2 I show my invention adapted to use with a double tandem arrangement of harrow gangs. In this figure the two leading sets of disks 60 and 61 are pivoted at 62 and 63 to a frame 65 having a draft chain 66 leading therefrom to a drag link 67. The following disk sets 70 and 71 are pivoted at 72 and 73 to the rearward extensions 74 and 75 of the frame 65. Flexible angular adjustment members are provided, as in the previous case, in the form of chains 77 which are engaged by grab links 78 situated upon the rearward ends of drag chains 79 which are attached at their forward ends to the drag link 67. The inner ends of the chain 77 are attached to the pipes 81 mounted upon the forward set 60 and 61 and the dragging ends of the chain 77 are attached at 83 to the following sets 70 and 71 of the arrangement.

As shown in Fig. 3 the grab links 78 are each provided with a notch 85 in which one of the links of the chains 77 may be engaged, as indicated at 86, thus making it possible to engage the chain 77 at any desired point therein so that an extremely fine adjustment in the positions of the members of the tandem are maintained. The dotted lines 89 and 90 of Fig. 2 illustrate one of the adjustments which may be obtained in the position of the forward and rearward gangs.

My invention provides a very economical and efficient construction for devices of this character. It will be perceived that the forward adjustment of one of the members of a tandem is always accompanied by a rearward adjustment of the other member, thereby preserving a balance in the forward and rearward angles of inclination so that the tendency for the harrow to travel to one side is overcome.

I claim as my invention:

1. In a position adjusting draft device for agricultural implements of the class described, the combination of: a draft member; a divided draft member having a flexible intermediate portion, one end of said divided draft member being attached to one vehicle and the other end thereof being attached to a following vehicle; and means on said draft member for selectively engaging said flexible intermediate portion of said divided draft member at a point giving the desired proportionate lengths of the divisions of said divided draft member.

2. In a position adjusting draft device of the class described, the combination of: a divided draft member having a flexible intermediate portion, one end of said divided draft member being attached to one vehicle, and the other end thereof being attached to a following vehicle; and means for selectively engaging said flexible intermediate portion of said divided draft member at a point giving the desired proportionate length of the divisions of said divided draft member.

3. In a position adjusting draft device for agricultural implements, the combination of: a draft member; a succession of vehicles following said draft member; a member engaged by said draft member, having one end thereof extending to one of said vehicles and the other end thereof extending to a following vehicle; and means for changing the point in said member at which it is engaged by said draft member.

4. In a position adjusting draft device for agricultural implements, the combination of: a draft member; a succession of vehicles following said draft member; a flexible member engaged by said draft member, having one end thereof extending to one of said vehicles and the other end thereof extending to a following vehicle; and means for changing the point in said member at which it is engaged by said draft member.

5. In a position adjusting draft device for agricultural implements, the combination of: a draft member; a succession of vehicles following said draft member; a continuous flexible member engaged by said draft member, having one end thereof extending to one of said vehicles and the other end thereof extending to a following vehicle; and means for changing the point in said member at which it is engaged by said draft member.

6. In a position adjusting draft device for agricultural implements, the combination of: a draft member; a succession of vehicles following said draft member; a continuous member having a flexible intermediate portion engaged by said draft member, having one end thereof extending to one of said vehicles and the other end thereof extending to a following vehicle; and means for changing the point in said member at which it is engaged by said draft member.

7. In an agricultural implement, the combination of: a pair of vehicles placed in successive arrangement; means flexibly linking said vehicles together at one end thereof; a draft element having attachment with the linked ends of said vehicles; a flexible draft member engaged by said draft element at an intermediate point therein, one end of said draft member being connected to the preceding of said vehicles at a point away from the linked end thereof, and the other end of said draft member being connected to the following of said vehicles; and means whereby the point in said draft member, at which it is engaged by said draft element, may be changed.

8. In an agricultural implement, the combination of: a pair of vehicles placed in successive arrangement; means flexibly linking said vehicles together at one end thereof; a draft element having attachment with the linked ends of said vehicles; a flexible draft member engaged by said draft element at an intermediate point therein, one end of said draft member being connected to the preceding of said vehicles, at a point away from the linked end thereof, and the other end of said draft member being connected to the following of said vehicles; means whereby the point in said draft member, at which it is engaged by said draft element, may be changed; and means upon said preceding vehicle for guiding that portion of said flexible draft member extending to said following vehicle.

9. In a harrow, the combination of: a leading disk set; a following disk set; flexible means connecting between two adjacent ends of said sets; a drag link; a drag member extending from said drag link to the end of said leading set at which connection is made with said following set; an engagement element having connection with said drag link; a pipe mounted near the end of said leading set, opposite to said connection with said following set; a chain engaged by said engagement element at an intermediate point, one end of said chain being connected to said leading set near the end thereof opposite to said flexible connection, and the other end of said chain passing through said pipe and being attached to said following set near the end thereof opposite to said flexible connection between said sets.

10. In a disk harrow, the combination of: a shaft; disks mounted upon said shaft; bearing means mounted near each end of said shaft; forwardly directed members secured upon said bearing means; a cross bar extending across the rear ends of said members; and means attached to the forward ends of said members for pulling said harrow.

11. In an agricultural implement, the combination of: a leading disk gang; a following disk gang; a bar mounted near one end of said leading disk gang, said bar extending horizontally in a direction perpendicular to the axis of said leading disk gang; a bar mounted upon the end of said following disk gang corresponding to the end of said forward disk gang upon which said forward bar is mounted; means providing horizontal rotation for joining the rear end of said bar mounted upon said leading gang to the forward end of said bar mounted upon said following gang; a draft member attached to the forward end of said bar mounted upon said leading gang; and an adjustable draft chain attached to swingable ends of said leading and following gangs.

In testimony whereof, I have hereunto set my hand at Santa Barbara, California, this 28th day of August 1922.

JOSEPH S. REYNOLDS.